(12) United States Patent
Wang et al.

(10) Patent No.: US 9,985,674 B2
(45) Date of Patent: *May 29, 2018

(54) SIM CARD CONNECTOR AND MOBILE TERMINAL HAVING THE SIM CARD CONNECTOR

(71) Applicant: Huawei Device (Dongguan) Co., Ltd., Dongguan (CN)

(72) Inventors: Xiaolong Wang, Shanghai (CN); Weibin Lai, Shenzhen (CN)

(73) Assignee: Huawei Device (Dongguan) Co., Ltd., Dongguan (CN)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/306,451

(22) PCT Filed: Apr. 25, 2014

(86) PCT No.: PCT/CN2014/076230
§ 371 (c)(1),
(2) Date: Oct. 24, 2016

(87) PCT Pub. No.: WO2015/161507
PCT Pub. Date: Oct. 29, 2015

(65) Prior Publication Data
US 2017/0054462 A1    Feb. 23, 2017

(51) Int. Cl.
*H04M 1/00* (2006.01)
*H04B 1/38* (2015.01)
(Continued)

(52) U.S. Cl.
CPC ....... *H04B 1/3816* (2013.01); *G06F 13/4081* (2013.01); *H02H 9/004* (2013.01); *H04M 1/026* (2013.01); *H04M 2250/14* (2013.01)

(58) Field of Classification Search
CPC ... H04B 1/3816; H04B 1/3818; H04M 1/026; H04M 1/0202; H04M 1/0274; H04M 2250/14
(Continued)

(56) References Cited

U.S. PATENT DOCUMENTS 5,699,406 A * 12/1997 Liikanen .............. G06K 7/0021
455/558
5,733,147 A * 3/1998 Verstijnen ............ H01R 12/714
235/441
(Continued)

FOREIGN PATENT DOCUMENTS

CN          2488198 U      4/2002
CN       102123205 A       7/2011
(Continued)

*Primary Examiner* — Quochien B Vuong
(74) *Attorney, Agent, or Firm* — Slater Matsil, LLP

(57) ABSTRACT

A SIM card connector includes a base, signal spring, a detection apparatus, and a controller. The detection apparatus includes a fixed contact and a detection spring. An action of a SIM card can be detected by means of separation or union between the fixed contact and the detection spring. A trigger part of the detection spring can press against a surface of the SIM card to move a movable end of the detection spring. A power supply of the signal spring can be cut off before the SIM card is separated from the signal spring, and the power supply of the signal spring can be switched on after the SIM card presses against the signal spring.

19 Claims, 3 Drawing Sheets

(51) Int. Cl.
*H04B 1/3816* (2015.01)
*G06F 13/40* (2006.01)
*H02H 9/00* (2006.01)
*H04M 1/02* (2006.01)

(58) Field of Classification Search
USPC .............................. 455/90.3, 556.1, 557.558
See application file for complete search history.

(56) References Cited

U.S. PATENT DOCUMENTS

| | | | |
|---|---|---|---|
| 6,409,529 B1 | 6/2002 | Liu et al. | |
| 6,557,761 B1 | 5/2003 | Oya et al. | |
| 6,688,899 B2 | 2/2004 | Rumpel | |
| 6,814,597 B1* | 11/2004 | Kao | H01R 13/633 |
| | | | 439/155 |
| 7,354,285 B1 | 4/2008 | Lin | |
| 7,357,678 B1* | 4/2008 | Lee | H01R 13/2442 |
| | | | 439/188 |
| 2003/0049968 A1 | 3/2003 | Nogami | |
| 2003/0227763 A1* | 12/2003 | Kao | G06K 7/0021 |
| | | | 361/818 |
| 2009/0149047 A1 | 6/2009 | Yu et al. | |
| 2010/0062646 A1 | 3/2010 | Matsumoto | |
| 2010/0091455 A1 | 4/2010 | Tang | |
| 2010/0327851 A1 | 12/2010 | Takahashi | |
| 2014/0101466 A1 | 4/2014 | Itakura | |
| 2015/0093938 A1 | 4/2015 | Tang et al. | |
| 2015/0111413 A1 | 4/2015 | Jiang | |
| 2017/0047958 A1* | 2/2017 | Wang | H01R 13/713 |
| 2017/0054462 A1 | 2/2017 | Wang et al. | |

FOREIGN PATENT DOCUMENTS

| | | |
|---|---|---|
| CN | 102420894 A | 4/2012 |
| CN | 202196962 U | 4/2012 |
| CN | 102709725 A | 10/2012 |
| CN | 102843449 A | 12/2012 |
| CN | 102945189 A | 2/2013 |
| CN | 103001075 A | 3/2013 |
| CN | 103094793 A | 5/2013 |
| CN | 103220411 A | 7/2013 |
| CN | 203167011 U | 8/2013 |
| CN | 203398388 U | 1/2014 |
| CN | 203456616 U | 2/2014 |
| DE | 10051693 A1 | 5/2002 |
| EP | 1148694 A1 | 10/2001 |

* cited by examiner

US 9,985,674 B2

SIM CARD CONNECTOR AND MOBILE TERMINAL HAVING THE SIM CARD CONNECTOR

CROSS-REFERENCE TO RELATED APPLICATIONS

This application is a national phase filing under section 371 of PCT/CN2014/076230, filed on Apr. 25, 2014, which application is hereby incorporated herein by reference.

TECHNICAL FIELD

The present invention relates to the field of mobile communications devices, and in particular, to a SIM card connector and a mobile terminal having the SIM card connector.

BACKGROUND

For an existing SIM card connector, in a case in which a battery is not pulled out, when a user takes a SIM card out of or puts a SIM card into the SIM card connector that is in a power-on state, a card burn out phenomenon is likely to occur. A reason is that the SIM card connector is still in the power-on state when the user performs a card insertion or removing action, and in this case, hot swap causes a momentary electric arc to be generated between a gold-plated area of the SIM card and signal spring. Consequently, a contact area is burned out, and the card cannot be read when the user uses a mobile phone.

SUMMARY

The present invention provides a SIM card connector and a mobile terminal having the SIM card connector, which can prevent a SIM card from being burned out when the card is being inserted and removed.

According to one aspect, a SIM card connector is provided, including a base and signal spring, where: the base has a bearer panel parallel to a SIM card, and the signal spring is disposed on the base; the SIM card connector further includes a detection apparatus and a controller, where the detection apparatus is disposed at the bearer panel of the base and configured to detect an action of the SIM card, and the controller is electrically connected to the detection apparatus and electrically connected to a power supply circuit of the signal spring; the detection apparatus includes a fixed contact and a detection spring, where the fixed contact is fixedly disposed facing the base, and the detection spring is strip-shaped and has a movable end and a fixed end; the fixed end is secured to the bearer panel of the base, and the movable end performs clutch cooperation with the fixed contact by means of elastic deformation of the detection spring, where a moving direction of separation or union between the movable end and the fixed contact is perpendicular to the bearer panel; the detection spring has a trigger part, and when the signal spring is in a free state, compared with the signal spring, the trigger part is closer to the bearer panel in a direction perpendicular to the bearer panel; and the trigger part can press against a surface of the SIM card to move the movable end, so that the controller changes a connectivity status of the power supply circuit of the signal spring.

In a first possible implementation manner, when the fixed contact is grounded, the detection spring is electrically connected to the controller; or when the fixed contact is electrically connected to the controller, the detection spring is grounded.

With reference to the foregoing implementation manners, in a second possible implementation manner, the signal spring has a pressing part, and the pressing part is configured to elastically press against the SIM card, where that compared with the signal spring, the trigger part is closer to the bearer panel specifically includes: compared with the pressing part, the trigger part is closer to the bearer panel.

With reference to the second possible implementation manner, in a third possible implementation manner, when the SIM card presses against the pressing part and the SIM card performs gap cooperation with the trigger part, the movable end and the fixed contact are in a first cooperation state, and the power supply circuit of the signal spring is in a disconnected state under control of the controller; when the SIM card presses against the pressing part and the SIM card presses against the trigger part, the movable end and the fixed contact are in a second cooperation state, and the controller controls the power supply circuit of the signal spring to be connected, where when the first cooperation state is that the movable end presses against the fixed contact, the second cooperation state is correspondingly that the movable end is separated from the fixed contact; or when the first cooperation state is that the movable end is separated from the fixed contact, the second cooperation state is correspondingly that the movable end presses against the fixed contact.

With reference to the third possible implementation manner, in a fourth possible implementation manner, an accommodation slot that can accommodate the detection spring is disposed at the bearer panel, and the fixed end is secured to a wall of the accommodation slot.

With reference to the four possible implementation manner, in a fifth possible implementation manner, in a case in which the first cooperation state is that the movable end is separated from the fixed contact, and the second cooperation state is correspondingly that the movable end presses against the fixed contact, the movable end is located between the fixed contact and the SIM card, and the fixed contact is secured to a bottom surface of the accommodation slot.

With reference to the fifth possible implementation manner, in a sixth possible implementation manner, a bearer component is secured to a bottom surface that is of the base and that is disposed facing the bearer panel, the accommodation slot is connected to the bearer component, and an area of a surface of the bearer component within the accommodation slot forms the bottom surface of the accommodation slot.

With reference to the fifth or the sixth possible implementation manner, in a seventh possible implementation manner, the fixed contact is a metal layer plated on the bottom surface of the accommodation slot.

With reference to the third to the seventh possible implementation manners, in an eighth possible implementation manner, in a case in which the first cooperation state is that the movable end is separated from the fixed contact, and the second cooperation state is correspondingly that the movable end presses against the fixed contact, the movable end is located between the fixed contact and the SIM card, the movable end has a detection convex arc surface that protrudes towards the fixed contact, and the detection convex arc surface can press against the fixed contact.

With reference to the eighth possible implementation manner, in a ninth possible implementation manner, the movable end is bent into a shape of an arc protruding towards the fixed contact, and a surface of the movable end facing the fixed contact forms the detection convex arc surface.

With reference to the ninth possible implementation manner, in a tenth possible implementation manner, the trigger part is located between the movable end and the fixed end, and the trigger part is relatively closer to the movable end; the trigger part is arched and formed by bending the detection spring towards the SIM card, and the trigger part and the movable end are connected in an S-shape.

With reference to any one of the foregoing implementation manners, in an eleventh possible implementation manner, the trigger part has a trigger convex arc surface protruding towards the SIM card, and the trigger convex arc surface can press against the SIM card.

With reference to the eleventh possible implementation manner, in a twelfth possible implementation manner, the trigger part is arched and formed by bending the detection spring towards the SIM card, and the top of the arched trigger part forms the trigger convex arc surface.

According to another aspect, a mobile terminal is provided, where the mobile terminal has the SIM card connector according to any one of the foregoing implementation manners.

According to the SIM card connector and the mobile terminal having the SIM card connector that are provided in the embodiments, a detection apparatus is disposed at a bearer panel of a base, and during a process of inserting or removing a SIM card, the SIM card can move a movable end of a detection spring to trigger a change in separation and union between the detection spring and a fixed contact. In addition, by using a controller, a power supply of signal spring can be cut off before the SIM card is separated from the signal spring, and the power supply of the signal spring can be switched on after the SIM card presses against the signal spring. The controller switches on or off the power supply in a timely manner, which effectively prevents the SIM card from being burned out by a momentary electric arc generated between the SIM card and the signal spring when the SIM card is being inserted or removed.

BRIEF DESCRIPTION OF THE DRAWINGS

To describe the technical solutions in the present invention more clearly, the following briefly describes the accompanying drawings required for describing the implementation manners. Apparently, the accompanying drawings in the following description show merely some implementation manners of the present invention, and a person of ordinary skill in the art may still derive other drawings from these accompanying drawings without creative efforts.

DETAILED DESCRIPTION OF ILLUSTRATIVE EMBODIMENTS

Figure 1:
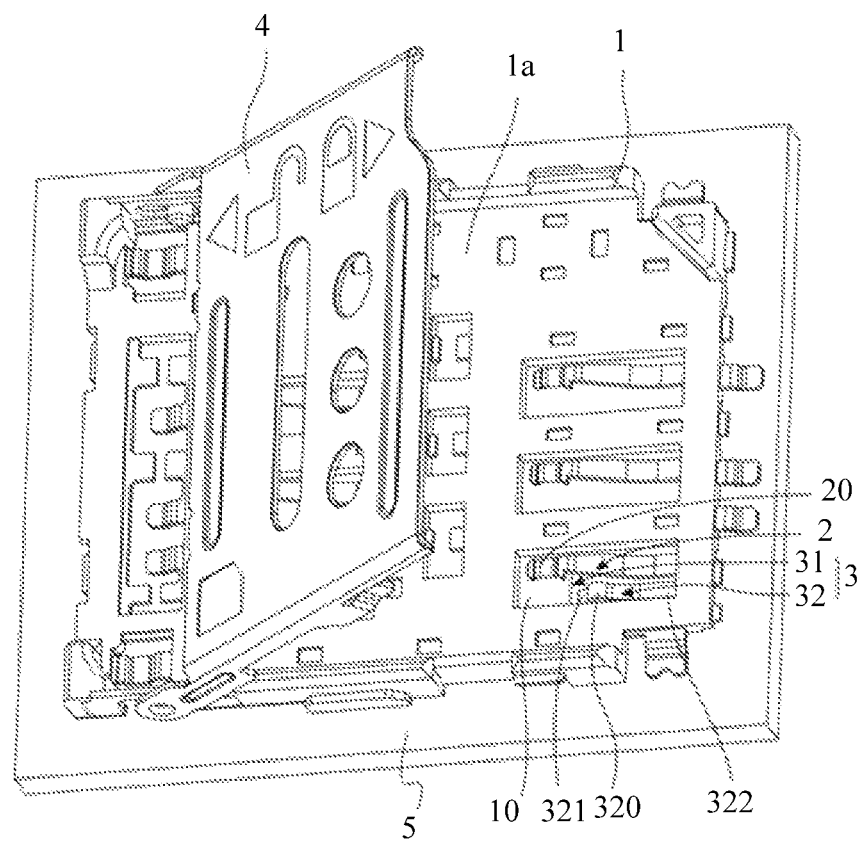
FIG. 1 is schematic diagram of a SIM card connector according to an implementation manner of the present invention.

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

An embodiment of the present invention provides a mobile terminal that has a SIM card connector. Referring to FIG. 1 to FIG. 5 at the same time, the SIM card connector includes a base 1, signal spring 2, a detection apparatus 3, and a controller (not shown in the figure). The signal spring 2 is disposed on the base 1 and configured to read information from or write information into a SIM card 9. The detection apparatus 3 is configured to detect an action of the SIM card 9. The controller is electrically connected to the detection apparatus 3 and electrically connected to a power supply circuit of the signal spring 2. The controller changes a connectivity status of the power supply circuit of the signal spring 2 according to a status of the detection apparatus 3.

As shown in FIG. 1 to FIG. 4, the base 1 has a bearer panel 1a parallel to the SIM card 9, the signal spring 2 has a pressing part 20, and the pressing part 20 is configured to elastically press against the SIM card 9. After the SIM card 9 is inserted, pressing parts 20 of multiple signal springs 2 can press against the SIM card 9 at the same time to read information from the SIM card 9 and write information into the SIM card 9.

The detection apparatus 3 is disposed at the bearer panel 1a of the base 1, and includes a fixed contact 31 and a detection spring 32. An action of the SIM card 9 can be detected by means of clutch cooperation between the fixed contact 31 and the detection spring 32. The clutch cooperation in the present invention means that the detection spring 32 can change from pressing against to being separated from the fixed contact 31 or in the other way around. In this embodiment, both the fixed contact 31 and the detection spring 32 are made of conductive materials, for example, a metal piece, so as to detect a clutch status between the detection spring 32 and the fixed contact 31.

In this embodiment, the fixed contact 31 is grounded, that is, connected to GND (ground), and the detection spring 32 is electrically connected to the controller. When the detection spring 32 presses against the fixed contact 31, electric potential of the detection spring 32 is in a grounded state. When the detection spring 32 is separated from the fixed contact 31, the electric potential of the detection spring 32 is raised. The detection spring 32 is electrically connected to the controller, and by detecting a change in the electric potential of the detection spring 32, the controller can determine the clutch status between the detection spring 32 and the fixed contact 31. Herein, in another implementation manner, the detection spring 32 is connected to the GND, and correspondingly, the fixed contact 31 is electrically connected to the controller; the clutch status between the detection spring 32 and the fixed contact 31 is determined by detecting a change in electric potential of the fixed contact 31. In still another implementation manner, the fixed contact 31 may be connected to the detection spring 32 and the controller to form a loop, and the controller can determine the clutch status between the fixed contact 31 and the detection spring 32 according to connection or disconnection of the loop.

The detection spring 32 is strip-shaped and has a movable end 321 and a fixed end 322. The fixed end 322 is secured to the bearer panel 1a of the base 1. The fixed end 322 of the detection spring 32 is electrically connected to the controller. The movable end 321 performs clutch cooperation with the fixed contact 31 by means of elastic deformation of the detection spring 32, where a moving direction of separation or union between the movable end 321 and the fixed contact 31 is perpendicular to the bearer panel 1a. In this embodiment, an accommodation slot 10 that can accommodate the detection spring 32 is disposed at the bearer panel 1a, and the fixed end 322 is secured to a wall of the accommodation slot 10. When the detection spring 32 is deformed under pressure of the SIM card 9, the detection spring 32 can be accommodated in the accommodation slot 10, so that after being inserted, the SIM card 9 can fit over the bearer panel 1a, ensuring stability of the inserted SIM card 9.

The fixed contact 31 is fixedly disposed facing the base 1, that is, a relative position between the fixed contact 31 and the base 1 is fixed. The fixed contact 31 may be directly secured to the base, or the fixed contact 31 may be inserted on a component that is secured to the base 1. In this embodiment, the fixed contact 31 is secured to a bottom surface of the accommodation slot 10. More specifically, a bearer component 5 is secured to a bottom surface that is of the base 1 and that is disposed facing the bearer panel 1a, the accommodation slot 10 is connected to the bearer component 5, and a surface area of the bearer component 5 within the accommodation slot 10 forms the bottom surface of the accommodation slot 10, which facilitates preparation, processing, and manufacturing. The bearer component 5 may be a PCB board of the mobile terminal, and when the base 1 is secured to the bearer component 5, the detection spring 32 can cooperate with the fixed contact 31 correspondingly. The fixed contact 31 is a metal layer plated on the bottom surface of the accommodation slot 10, so that space occupied by the fixed contact 31 is reduced, and a compact structure also fits miniaturization of the SIM card connector. Herein, in another implementation manner, the bearer component 5 may also be a mechanical part of another structure in the mobile terminal, so that the mechanical part in the mobile terminal is used to implement configuration of the fixed contact 31 and the entire SIM card connector.

The detection spring 32 has a trigger part 320, and the trigger part 320 can press against a surface of the SIM card 9 to move the movable end 321 to change the clutch status between the movable end 321 and the fixed contact 31. In this embodiment, the movable end 321 is located between the fixed contact 31 and the SIM card 9, and compared with the trigger part 320, the movable end 321 is closer to the fixed contact 31. When the SIM card 9 presses against the trigger part 320, the movable end 321 of the detection spring 32 moves towards and presses against the fixed contact 31. When a force of the SIM card 9 acting on the trigger part 320 is withdrawn, under an elastic restoring force of the detection spring 32, the movable end 321 of the detection spring 32 moves in a direction away from the fixed contact 31 and is separated from the fixed contact 31.

Figure 4:
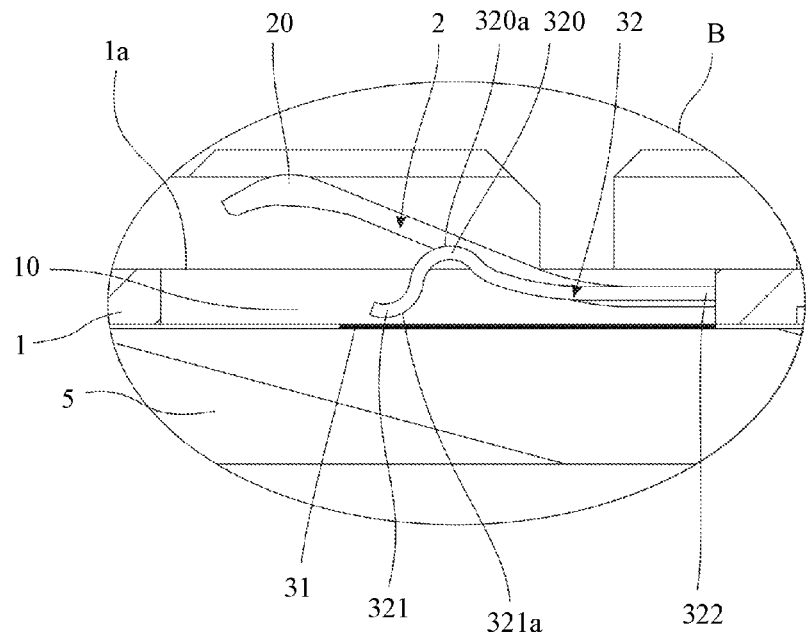
FIG. 4 an enlarged view of an area B in FIG. 3.

As shown in FIG. 4, the trigger part 320 has a trigger convex arc surface 320a protruding towards the SIM card 9, and the trigger convex arc surface 320a can press against the SIM card 9. Friction is generated between the trigger part 320 and the SIM card 9 after the trigger part 320 presses against the SIM card 9, and therefore, by using the trigger convex arc surface 320a, abrasion between the trigger part 320 and the SIM card 9 can be reduced and a useful life of the SIM card connector can be extended. More specifically, the trigger part 320 is arched and formed by bending the detection spring 32 towards the SIM card 9, and the top of the arched trigger part 320 forms the trigger convex arc surface 320a. The arched trigger part 320 can ensure structural strength of the detection spring 32 at the trigger part 320, which is also helpful in processing and shaping. Herein, in another implementation manner, the trigger part 320 may be a boss or a protrusion disposed on the detection spring 32, and a top surface of the trigger part 320 is the trigger convex arc surface 320a.

The movable end 321 has a detection convex arc surface 321a that protrudes towards the fixed contact 31, and the detection convex arc surface 321a can press against the fixed contact 31. Friction is generated between the movable end 321 and the SIM card 9 after the movable end 321 presses against the fixed contact 31, and therefore, by using the detection convex arc surface 321a, abrasion between the movable end 321 and the SIM card 9 can be reduced, and the useful life of the SIM card connector can be extended. More specifically, the movable end 321 is bent into a shape of an arc protruding towards the fixed contact 31, and a surface of the movable end 321 facing the fixed contact 31 forms the detection convex arc surface 321a, which is helpful in processing and shaping. Herein, in another embodiment, the movable end 321 extends towards the fixed contact 31 to form a convex hull, and an exterior surface of the convex hull forms the detection convex arc surface 321a. In this embodiment, the trigger part 320 is located between the movable end 321 and the fixed end 322, and the trigger part 320 is relatively closer to the movable end 321. The trigger part 320 and the movable end 321 are connected in an S-shape, which is helpful in overall processing and shaping of the detection spring 32. In addition, elastic deformation can be generated between the movable end 321 and the trigger part 320, ensuring pressing reliability and preventing the surface of the SIM card 9 from being abraded.

Figure 2:
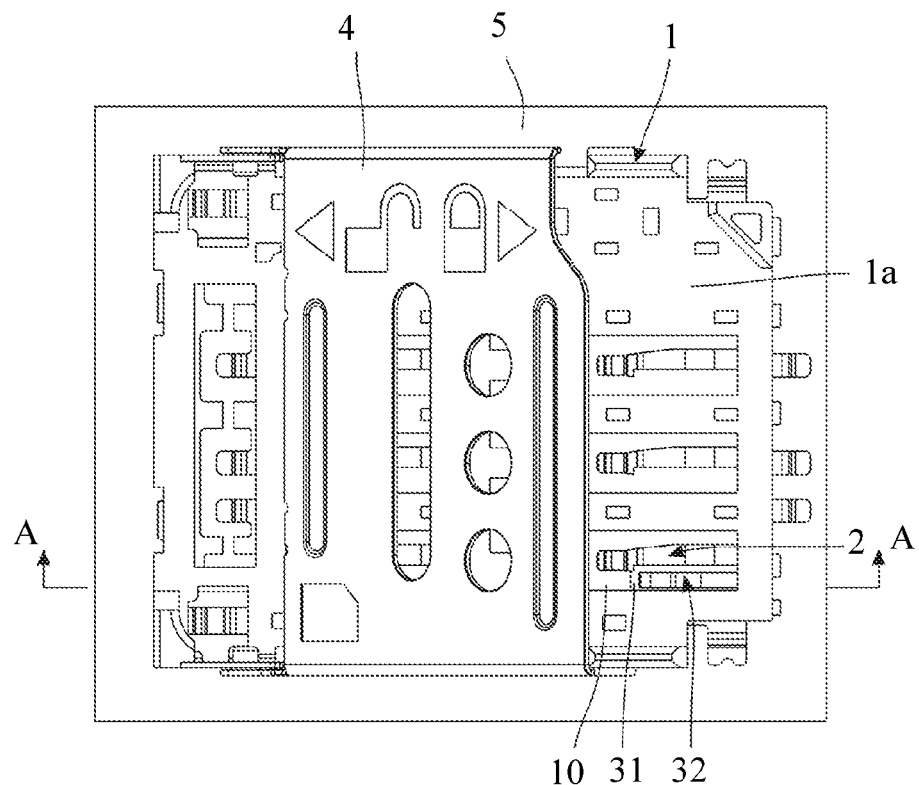
FIG. 2 is a top view of the SIM card connector in FIG. 1.
Figure 3:
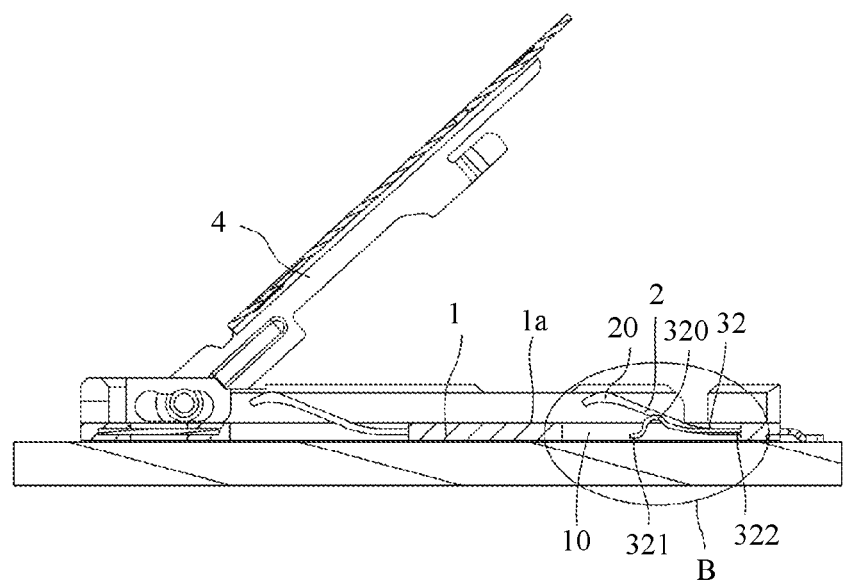
FIG. 3 is a sectional view in a position A-A of the SIM card connector in FIG. 2.

As shown in FIG. 1 to FIG. 3, the SIM card connector further includes a flip 4, where the flip 4 is connected to the base 1 in a rotating manner and configured to lock the SIM card 9 tightly onto the base 1, so that the SIM card connector is a flip-type card connector, and the SIM card 9 can be inserted into the base 1 in a direction roughly perpendicular to the bearer panel 1a.

Figure 5:
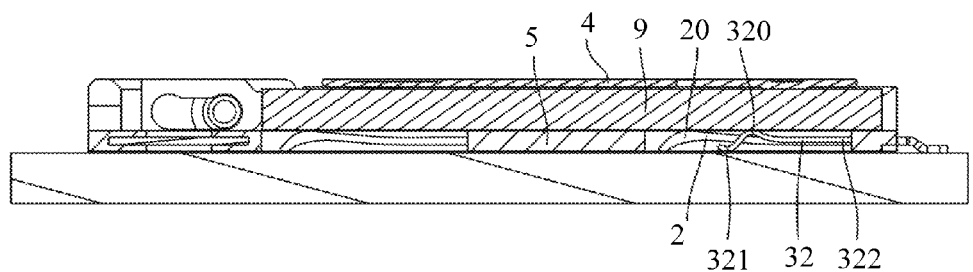
FIG. 5 is a schematic diagram of the SIM card connector in FIG. 2 equipped with a SIM card.

When the signal spring 2 is in a free state, as shown in FIG. 4, compared with the signal spring 2, the trigger part 320 is closer to the bearer panel 1a in a direction perpendicular to the bearer panel 1a. The free state described in the present invention refers to a state in which no external force acts on the signal spring 2. More specifically, because the pressing part 20 of the signal spring 2 presses against the SIM card 9, compared with the pressing part 20 of the signal spring 2, the trigger part 320 is closer to the bearer panel 1a. Therefore, during inserting of the SIM card 9, the SIM card 9 may first press against the pressing part 20 of the signal spring 2, and then press against the trigger part 320. When the SIM card 9 presses against the signal spring 2 and the SIM card 9 performs gap cooperation with the trigger part 320, the movable end 321 and the fixed contact 31 are in a first cooperation state, and the power supply circuit of the signal spring 2 is in a disconnected state under control of the controller. The gap cooperation of the SIM card 9 and the trigger part 320 means that the SIM card 9 is not in contact with the trigger part 320. As shown in FIG. 5, when the SIM card 9 presses against the pressing part 20 of the signal spring 2 and the SIM card 9 connector 9 presses against the trigger part 320, the movable end 321 and the fixed contact 31 are in a second cooperation state, and the power supply circuit of the signal spring 2 is connected under the control of the controller. In this embodiment, the first cooperation state is that the movable end 321 is separated from the fixed contact 31, and the second cooperation state is correspondingly that the movable end 321 presses against the fixed contact 31

As shown in FIG. 4, when the SIM card 9 is not inserted into the SIM card 9 connector, the signal spring 2 is in a free state with no acting force. The movable end 321 of the detection spring 32 and the fixed contact 31 are in a separated state, so as to hang the movable end 321. According to this state, the controller sets the power supply circuit of the signal spring 2 to a disconnected state, so that the signal spring 2 is not connected to a power supply. When the SIM card 9 is being inserted into the SIM card connector in the direction perpendicular to the bearer panel 1a, because compared with the pressing part 20, the trigger part 320 is closer to the bearer panel 1a, the SIM card 9 first presses against the pressing part 20 and performs gap cooperation with the trigger part 320, so that the SIM card 9 is connected to the signal spring 2 that is not connected to the power supply, which prevents generating an electric arc that burns out the SIM card 9. In the meantime, the SIM card 9 may effectively presses against the multiple signal springs 2 at the same time during the SIM card 9 moves from the pressing part 20 to the trigger part 320. Inserting of the SIM card 9 continues. As shown in FIG. 5, an end of the SIM card 9 presses against the trigger part 320 of the detection spring 32, so that the movable end 321 of the detection spring 32 moves and enters a pressing state with the fixed contact 31. The electric potential of the detection spring 32 is lowered, and when identifying a low potential signal of the detection spring 32, the controller controls the power supply circuit of the signal spring 2 to change into a connected state, so as to connect to the power supply of the signal spring 2.

When the SIM card 9 is being removed from the SIM card 9 connector, the SIM card 9 is first separated from the trigger part 320, the detection spring 32 is separated from the fixed contact 31, the electric potential of the detection spring 32 is raised, and the controller controls the power supply circuit of the signal spring 2 to change into a disconnected state, so as to disconnect the power supply of the signal spring 2. In this case, the SIM card 9 still presses against the multiple signal springs 2. Removal of the SIM card 9 continues, and the SIM card 9 may be separated from the signal spring 2. In this case, because the power supply of the signal spring 2 is already disconnected, it can be effectively avoided that the SIM card 9 is burned out by an electric arc generated in a contact area between the SIM card 9 and the signal spring 2.

According to the SIM card 9 connector provided in this embodiment, a detection apparatus 3 is disposed at a bearer panel 1a of a base 1, and during a process of inserting or removing a SIM card 9, the SIM card 9 can trigger a change in separation and union between a detection spring 32 and a fixed contact 31. By using a controller, a power supply of signal spring 2 can be cut off before the SIM card 9 is separated from the signal spring 2, and the power supply of the signal spring 2 can be switched on after the SIM card 9 presses against the signal spring 2. The controller switches on or off the power supply in a timely manner, which effectively prevents the SIM card 9 from being burned out by a momentary electric arc generated between the SIM card 9 and the signal spring 2 when the SIM card 9 is being inserted or removed. The controller may be a processor of the mobile terminal, or may be an independent integrated circuit (IC) or another controller; or the clutch status between the detection spring 32 and the fixed contact 31 may be identified with the help of software.

In the foregoing implementation manner, the movable end 321 of the detection spring 32 is located between the SIM card 9 and the fixed contact 31; when the SIM card 9 is not inserted, the movable end 321 of the detection spring 32 is separated from the fixed contact 31; after the SIM card 9 is inserted, the movable end 321 of the detection spring 32 moves in a direction towards the fixed contact 31 and then presses against the fixed contact 31, so that a first cooperation state is that the movable end 321 of the detection spring 32 is separated from the fixed contact 31, and a second cooperation state is that the movable end 321 of the detection spring 32 presses against the fixed contact 31. Herein, in another implementation manner, the first cooperation state between the movable end 321 of the detection spring 32 and the fixed contact 31 may also be that the movable end 321 of the detection spring 32 presses against the fixed contact 31, and the second cooperation state between the movable end 321 of the detection spring 32 and the fixed contact 31 is correspondingly that the movable end 321 of the detection spring 32 is separated from the fixed contact 31. In addition, the movable end 321 of the detection spring 32fixed contact is located between the fixed contact 31 and the SIM card 9. When the SIM card 9 is not inserted, the movable end 321 of the detection spring 32 is separated from the fixed contact 31. After the SIM card 9 is inserted, the movable end 321 of the detection spring 32 moves in a direction away from the SIM card 9 and then presses against the fixed contact 31. The controller may determine a clutch status between the detection spring 32 and the fixed contact 31 to control in a timely manner connection and disconnection of the power supply of the signal spring 2.

Finally, it should be noted that the foregoing embodiments are merely intended for describing the technical solutions of the present invention but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A Subscriber Identity Module (SIM) card connector, comprising:
   a base, comprising a bearer panel parallel to a SIM card;
   a signal spring disposed on the base;
   a detection apparatus disposed at the bearer panel of the base and configured to detect an action of the SIM card; and
   a controller electrically connected to the detection apparatus and electrically connected to a power supply circuit of the signal spring;
   wherein the detection apparatus further comprises a fixed contact and a detection spring, wherein the fixed contact is fixedly disposed facing the base, and the detection spring has a movable end and a fixed end;
   wherein the fixed end is secured to the bearer panel of the base, and the movable end performs clutch cooperation with the fixed contact using elastic deformation of the detection spring; and
   wherein the detection spring has a trigger part, and the trigger part is configured to press against a surface of the SIM card to move the movable end, so that the controller changes a connectivity status of the power supply circuit of the signal spring.

2. The SIM card connector according to claim 1, wherein when the fixed contact is grounded, and the detection spring is electrically connected to the controller; or
wherein when the fixed contact is electrically connected to the controller, the detection spring is grounded.

3. The SIM card connector according to claim 1, wherein the signal spring comprises a pressing part, and the pressing part is configured to elastically press against the SIM card; and
wherein the trigger part is closer to the bearer panel than the pressing part.

4. The SIM card connector according to claim 3, wherein when the SIM card presses against the pressing part and the SIM card performs gap cooperation with the trigger part, the movable end and the fixed contact are in a first cooperation state, and the power supply circuit of the signal spring is in a disconnected state under control of the controller;
wherein when the SIM card presses against the pressing part and the SIM card presses against the trigger part, the movable end and the fixed contact are in a second cooperation state, and the controller controls the power supply circuit of the signal spring to be connected; and
wherein when the first cooperation state is that the movable end presses against the fixed contact, the second cooperation state is correspondingly that the movable end is separated from the fixed contact; or when the first cooperation state is that the movable end is separated from the fixed contact, the second cooperation state is correspondingly that the movable end presses against the fixed contact.

5. The SIM card connector according to claim 4, wherein an accommodation slot that can accommodate the detection spring is disposed at the bearer panel, and the fixed end is secured to a wall of the accommodation slot.

6. The SIM card connector according to claim 5, wherein the first cooperation state is that the movable end is separated from the fixed contact, the second cooperation state is that the movable end presses against the fixed contact, the movable end is located between the fixed contact and the SIM card, and the fixed contact is secured to a bottom surface of the accommodation slot.

7. The SIM card connector according to claim 6, wherein a bearer component is secured to a bottom surface of the base that is disposed facing the bearer panel, the accommodation slot is connected to the bearer component, and a surface area of the bearer component within the accommodation slot forms the bottom surface of the accommodation slot.

8. The SIM card connector according to claim 6, wherein the fixed contact is a metal layer plated on the bottom surface of the accommodation slot.

9. The SIM card connector according to claim 4, wherein the first cooperation state is that the movable end is separated from the fixed contact, the second cooperation state is that the movable end presses against the fixed contact, the movable end is located between the fixed contact and the SIM card, the movable end has a detection convex arc surface that protrudes towards the fixed contact, and the detection convex arc surface is configured to be able to press against the fixed contact.

10. The SIM card connector according to claim 9, wherein the movable end is bent into a shape of an arc protruding towards the fixed contact, and a surface of the movable end facing the fixed contact forms the detection convex arc surface.

11. The SIM card connector according to claim 1, wherein the trigger part is located between the movable end and the fixed end, the trigger part being relatively closer to the movable end; and
wherein the trigger part is arched and formed by bending the detection spring towards the SIM card, and the trigger part and the movable end are connected in an S-shape.

12. The SIM card connector according to claim 1, wherein the trigger part comprises a trigger convex arc surface protruding towards the SIM card, and the trigger convex arc surface is configured to be able to press against the SIM card.

13. The SIM card connector according to claim 12, wherein the trigger part is arched and formed by bending the detection spring towards the SIM card, and a top of the arched trigger part forms the trigger convex arc surface.

14. A mobile terminal, comprising a subscriber identity module (SIM) card connector, the SIM card connector comprising:
a base comprising a bearer panel parallel to a SIM card;
a signal spring disposed on the base;
a detection apparatus disposed at the bearer panel of the base and configured to detect an action of the SIM card; and
a controller, electrically connected to the detection apparatus and electrically connected to a power supply circuit of the signal spring;
wherein the detection apparatus comprises a fixed contact and a detection spring, wherein the fixed contact is fixedly disposed facing the base, and the detection spring has a movable end and a fixed end;
wherein the fixed end is secured to the bearer panel of the base, and the movable end performs clutch cooperation with the fixed contact using elastic deformation of the detection spring;
wherein the detection spring has a trigger part, the trigger part being configured to be able to press against a surface of the SIM card to move the movable end, so that the controller changes a connectivity status of the power supply circuit of the signal spring.

15. The mobile terminal according to claim 14, wherein when the fixed contact is grounded, and the detection spring is electrically connected to the controller; or
wherein when the fixed contact is electrically connected to the controller, the detection spring is grounded.

16. The mobile terminal according to claim 14, wherein the signal spring comprises a pressing part, and the pressing part is configured to elastically press against the SIM card; and
wherein the trigger part is closer to the bearer panel than the pressing part.

17. A Subscriber Identity Module (SIM) card connector, comprising:
a base, comprising a bearer panel parallel to a SIM card;
a signal spring disposed on the base;
a detection apparatus disposed at the bearer panel of the base and configured to detect an action of the SIM card; and
a controller electrically connected to the detection apparatus and electrically connected to a power supply circuit of the signal spring;
wherein the detection apparatus further comprises a fixed contact and a detection spring, wherein the fixed contact is fixedly disposed facing the base, and the detection spring has a movable end and a fixed end;

wherein the fixed end is secured to the bearer panel of the base, and the movable end performs clutch cooperation with the fixed contact using elastic deformation of the detection spring;

wherein the detection spring has a trigger part, and the trigger part is configured to press against a surface of the SIM card to move the movable end, so that the controller changes a connectivity status of the power supply circuit of the signal spring;

wherein the signal spring comprises a pressing part, and the pressing part is configured to elastically press against the SIM card; and wherein the trigger part is closer to the bearer panel than the pressing part.

18. The SIM card connector according to claim 17, wherein when the SIM card presses against the pressing part and the SIM card performs gap cooperation with the trigger part, the movable end and the fixed contact are in a first cooperation state, and the power supply circuit of the signal spring is in a disconnected state under control of the controller;

wherein when the SIM card presses against the pressing part and the SIM card presses against the trigger part, the movable end and the fixed contact are in a second cooperation state, and the controller controls the power supply circuit of the signal spring to be connected; and wherein when the first cooperation state is that the movable end presses against the fixed contact, the second cooperation state is correspondingly that the movable end is separated from the fixed contact; or when the first cooperation state is that the movable end is separated from the fixed contact, the second cooperation state is correspondingly that the movable end presses against the fixed contact.

19. The SIM card connector according to claim 18, wherein an accommodation slot that can accommodate the detection spring is disposed at the bearer panel, and the fixed end is secured to a wall of the accommodation slot.

* * * * *